United States Patent
Filev et al.

(10) Patent No.: US 10,152,037 B2
(45) Date of Patent: Dec. 11, 2018

(54) SYSTEM AND METHOD FOR FEEDBACK ERROR LEARNING IN NON-LINEAR SYSTEMS

(71) Applicant: Ford Global Technologies, LLC, Dearborn, MI (US)

(72) Inventors: Dimitar Petrov Filev, Novi, MI (US); Michio Sugeno, Dai (JP); Yan Wang, Ann Arbor, MI (US); Luka Eciolaza, Idiazabal (ES); Tadanari Taniguchi, Hadano (JP); John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1266 days.

(21) Appl. No.: 13/938,080

(22) Filed: Jul. 9, 2013

(65) Prior Publication Data
US 2015/0018981 A1   Jan. 15, 2015

(51) Int. Cl.
*G05B 13/04* (2006.01)
*F02D 41/14* (2006.01)
*F02D 41/00* (2006.01)

(52) U.S. Cl.
CPC ........ *G05B 13/048* (2013.01); *F02D 41/0007* (2013.01); *F02D 41/1402* (2013.01); *G05B 13/04* (2013.01); *F02D 41/0002* (2013.01); *F02D 2041/001* (2013.01); *F02D 2041/141* (2013.01); *F02D 2041/1434* (2013.01); *Y02T 10/144* (2013.01)

(58) Field of Classification Search
USPC ......................................................... 706/16
See application file for complete search history.

(56) References Cited

U.S. PATENT DOCUMENTS

| 6,330,483 | B1 * | 12/2001 | Dailey ..................... G05B 5/01 318/561 |
| 9,616,898 | B2 * | 4/2017 | D'Amato ............ B60W 40/076 |
| 9,657,635 | B2 * | 5/2017 | Wang .................. F02D 41/1401 |
| 9,664,129 | B2 * | 5/2017 | Surnilla .............. F02D 41/0077 |
| 9,670,834 | B2 * | 6/2017 | Wang ..................... F02B 37/186 |
| 9,683,468 | B2 * | 6/2017 | Wang .................. F01L 13/0015 |
| 9,731,617 | B2 * | 8/2017 | Tseng .................. B60L 11/1838 |
| 9,732,669 | B2 * | 8/2017 | Wang ...................... F02B 37/16 |
| 9,824,505 | B2 * | 11/2017 | Tseng ...................... G07C 5/00 |

(Continued)

FOREIGN PATENT DOCUMENTS

EP   1359481 A1   11/2003

OTHER PUBLICATIONS

Ahmed H. El-Shaer, Mohammad Al Janaideh, Pavel Krejci, Masayoshi Tomizuka, "Robust Performance Enhancement Using Disturbance Observers for Hysteresis Compensation Based on Generalized Prandtl-Ishlinskii Model", Journal of Dynamic Systems, Measurement and Control, published online on May 29, 2013, pp. 1-13.*

(Continued)

*Primary Examiner* — Michael B Holmes
(74) *Attorney, Agent, or Firm* — Julia Voutyras; McCoy Russell LLP (57) ABSTRACT

A method for operating an actuator is disclosed. The actuator may be a linear or non-linear actuator. In one example, a pseudo-inverse piecewise bilinear model is adapted in response to output of a feedback controller to improve feed forward control.

13 Claims, 4 Drawing Sheets

(56) References Cited

U.S. PATENT DOCUMENTS

| | | | | |
|---|---|---|---|---|
| 9,849,880 | B2* | 12/2017 | D'Amato | B60W 30/143 |
| 9,874,160 | B2* | 1/2018 | D'Amato | F02D 28/00 |
| 9,966,057 | B1* | 5/2018 | Wang | F02N 11/0814 |
| 10,006,349 | B2* | 6/2018 | Luehrsen | F02D 41/0007 |
| 10,037,695 | B2* | 7/2018 | D'Amato | G08G 1/0112 |
| 2007/0033953 | A1* | 2/2007 | Gao | B60H 1/00764 |
| | | | | 62/133 |
| 2012/0116648 | A1* | 5/2012 | Russ | F02M 26/00 |
| | | | | 701/102 |
| 2013/0000570 | A1* | 1/2013 | Leone | F02B 43/12 |
| | | | | 123/3 |
| 2013/0110367 | A1* | 5/2013 | To | B60K 31/18 |
| | | | | 701/70 |

OTHER PUBLICATIONS

Luka Eciolaza and Michio Sugeno, "On-line Design of LUT Controllers Based on Desired Closed Loop Plant: Vertex Placement Principle", WCCI 2012 IEEE World Congress on Computational Intelligence, Brisbane, Australia, Jun. 10, 2012, pp. 1-8.*

Eciolaza, L., Taniguchi, T. ; Sugeno, M. ; Filev, D. ; Yan Wang, "Piecewise Bilinear models for feedback error learning: On-line feedforward controller design", Fuzzy Systems (FUZZ), 2013 IEEE International Conference on, Jul. 7, 2013, pp. 1-8.*

Elsevier Annual Reviews in Control vol. 41, 2016, pp. 94-118 a review on control system architecture of a SI engine management system B. Ashok, S. Denis Ashok, C. Ramesh Kumar.*

* cited by examiner

SYSTEM AND METHOD FOR FEEDBACK ERROR LEARNING IN NON-LINEAR SYSTEMS

BACKGROUND

Feedback error learning (FEL) has been described as a way to identify an inverse linear or neural network plant model.

SUMMARY

The inverse plant model may be used as part of a feed forward control system to control a plant. For example, a desired trajectory of an actuator may be input into the inverse plant model and a control command to follow the desired trajectory is output from the inverse plant model. The inverse plant model may be identified via FEL by adapting parameters of a feed forward inverse linear model or neural network based on output of a feedback controller. The inverse linear model or neural network model is a basis for control commands while the feedback controller output is used to adapt linear model or neural network model parameters and correct control actions originating from the inverse plant model. As such, there are considered two types of FEL, namely, FEL with neural network model and FEL with linear model.

FEL was originally proposed as a way to control a device or apparatus in a way that is similar to the way a human brain controls motion of an arm or leg. Biological control systems including a brain may have slow or delayed feedback. However, some researchers believe that the brain provides quick and smooth control actions based on knowledge of an inverse plant model. With this knowledge, the brain may command a limb to a desired trajectory without having to wait to receive feedback from nerves or senses.

Initially, studies of FEL included only neural network models. Neural network models may be used to control any non-linear plant. However, neural network models have complex structures, and therefore, it may be very difficult to make a theoretical analysis of the control provided by the neural network model. For example, it may be difficult to perform a stability analysis of the control system when a neural network is applied. Also, neural network models are somewhat of a black or grey box by their nature. Therefore, when FEL is combined with a neural network model, the approach is not adequate for practical use.

Control theorists later introduced FEL with linear models and demonstrated that FEL with linear models could be analyzed for stability. However, when FEL is combined with a linear model, it is only applicable to linear plants. Consequently, FEL with neural network models or linear models have been somewhat limited in application and practice.

The inventors herein have recognized the above-mentioned disadvantages and have developed FEL with a piecewise bilinear model. This is a method for controlling a system, comprising: providing a pseudo-inverse piecewise bilinear model of a plant; adapting the pseudo-inverse piecewise bilinear model based on an output of a feedback controller; and adjusting operation of an actuator in response to the pseudo-inverse piecewise bilinear model.

By adapting a pseudo-inverse piecewise bilinear model in response to output of a feedback controller, it may be possible to provide the technical result of improving feed forward control for non-linear systems. In particular, an inverse model of an actuator may be described in an N dimensional lookup table. Lookup table entries and vertexes may be adjusted via input from a feedback controller such that output of the feedback controller is eventually driven toward zero. The lookup table provides a near exact inverse model of the plant under control when output of the feedback controller reaches zero. Consequently, an actuator or plant command output from the lookup table may cause the plant to follow a desired trajectory that was a basis for indexing data in the lookup table.

Additionally, by applying FEL with a piecewise bilinear model, any non-linear plant may be controlled, as with a neural network model, but in a more transparent way. For example, a piecewise bilinear model is a white box since it is represented by look-up-table. Therefore, FEL with a piecewise bilinear model is very adequate for practical use. Also, a piecewise bilinear model is parametric exactly like a linear model. Therefore, theoretical analysis of control provided by the system is easily made.

The present description may provide several advantages. For example, the approach may allow an actuator to more closely follow a desired trajectory. Additionally, the approach seeks to improve actuator performance in a control system. Further, the approach may be applied to existing vehicle control systems where non-linear plants are common, and lookup tables are widely used for controls.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
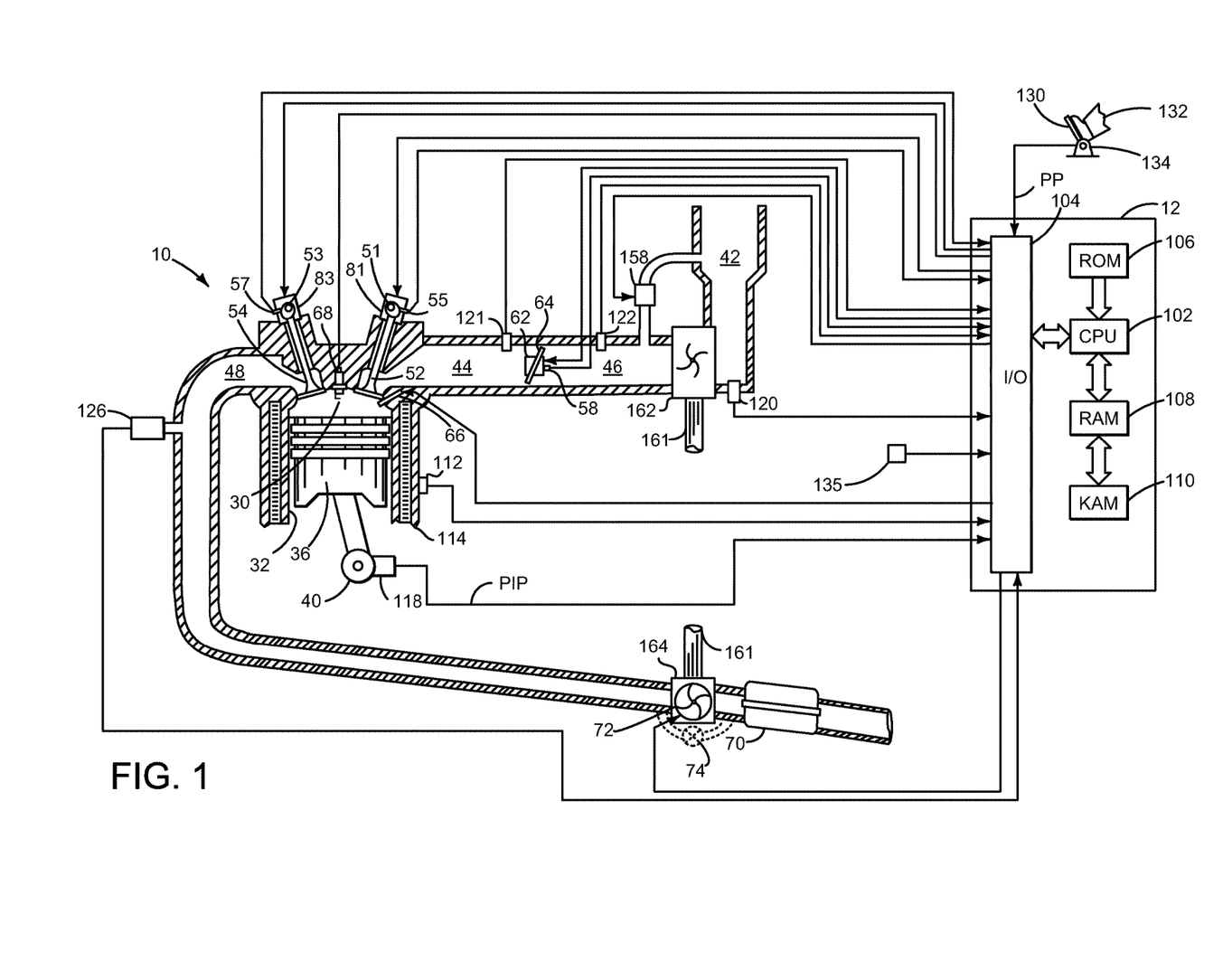
FIG. 1 shows a schematic depiction of an engine.
Figure 2:
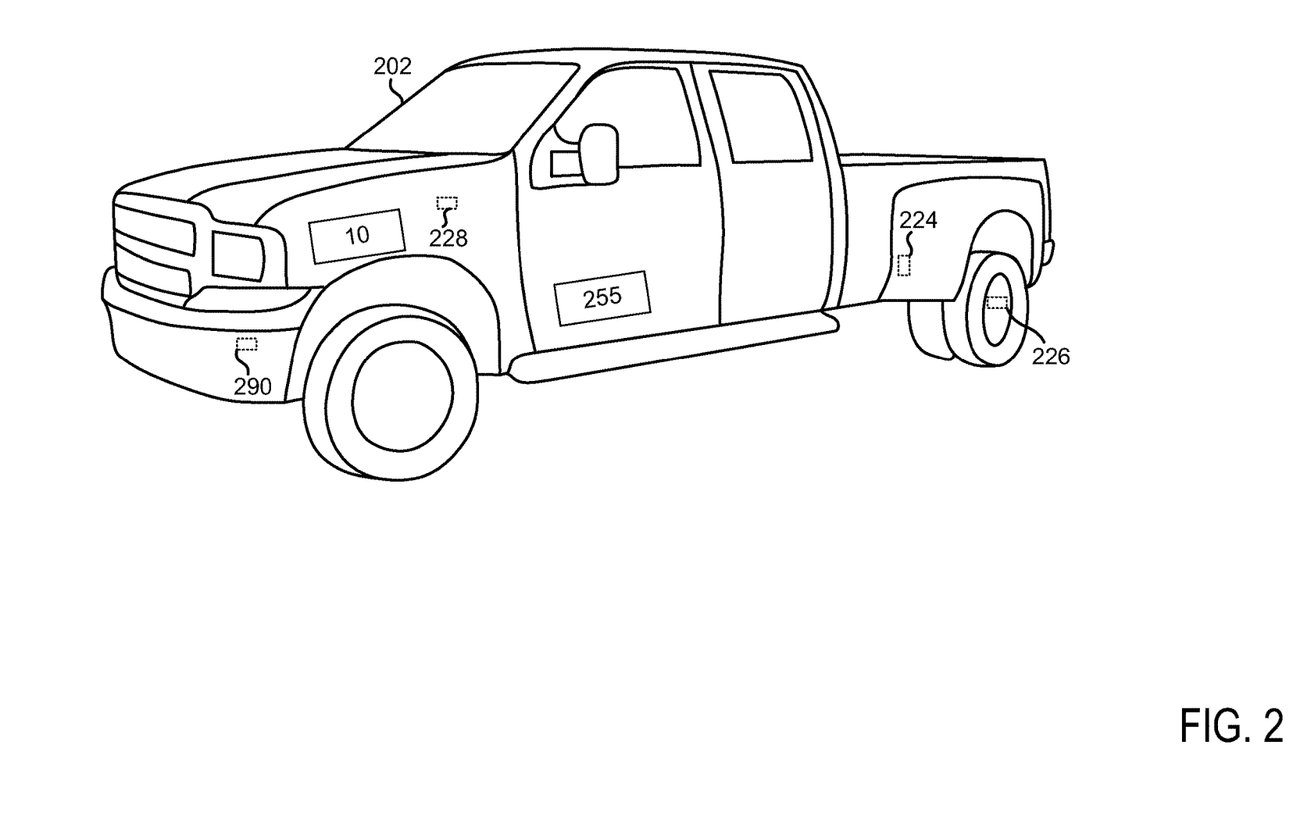
FIG. 2 shows a vehicle in which the engine may operate.
Figure 3:
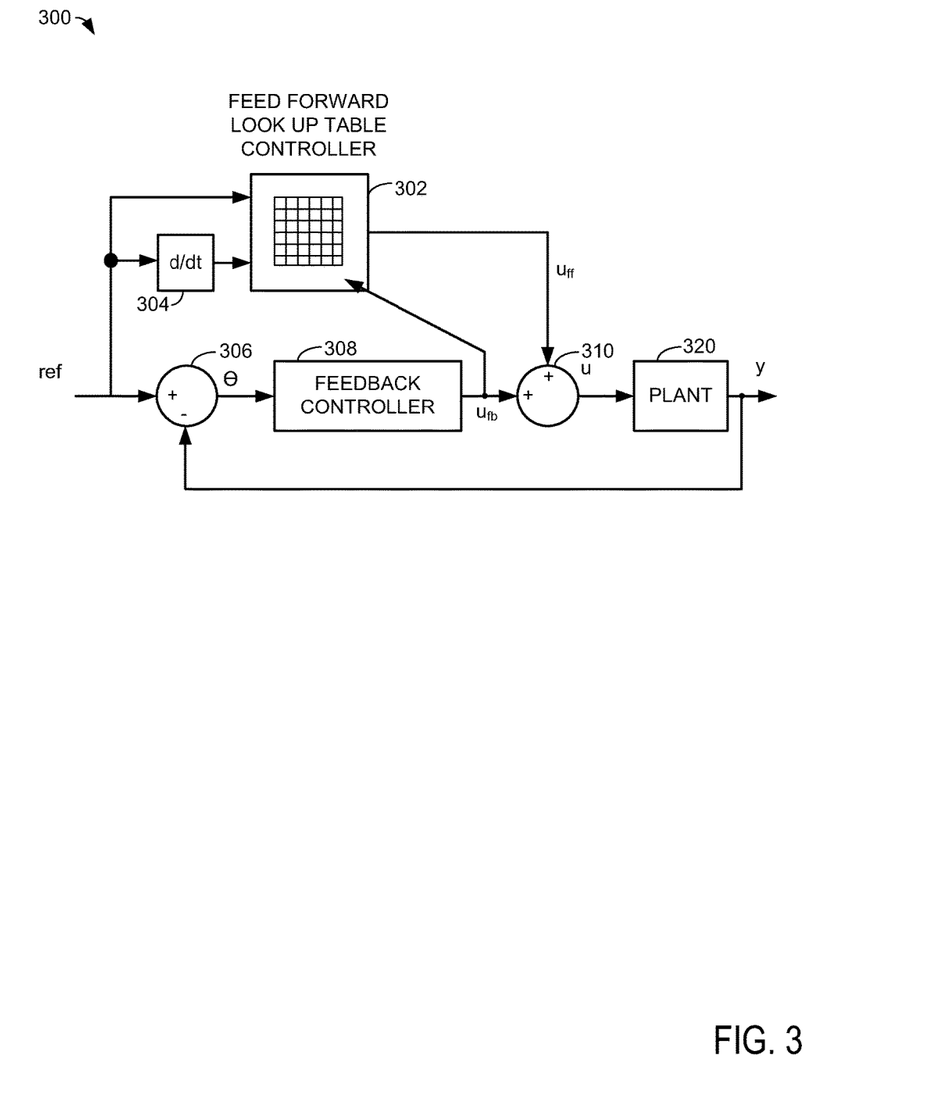
FIG. 3 shows an example block diagram of a controller.
Figure 4:
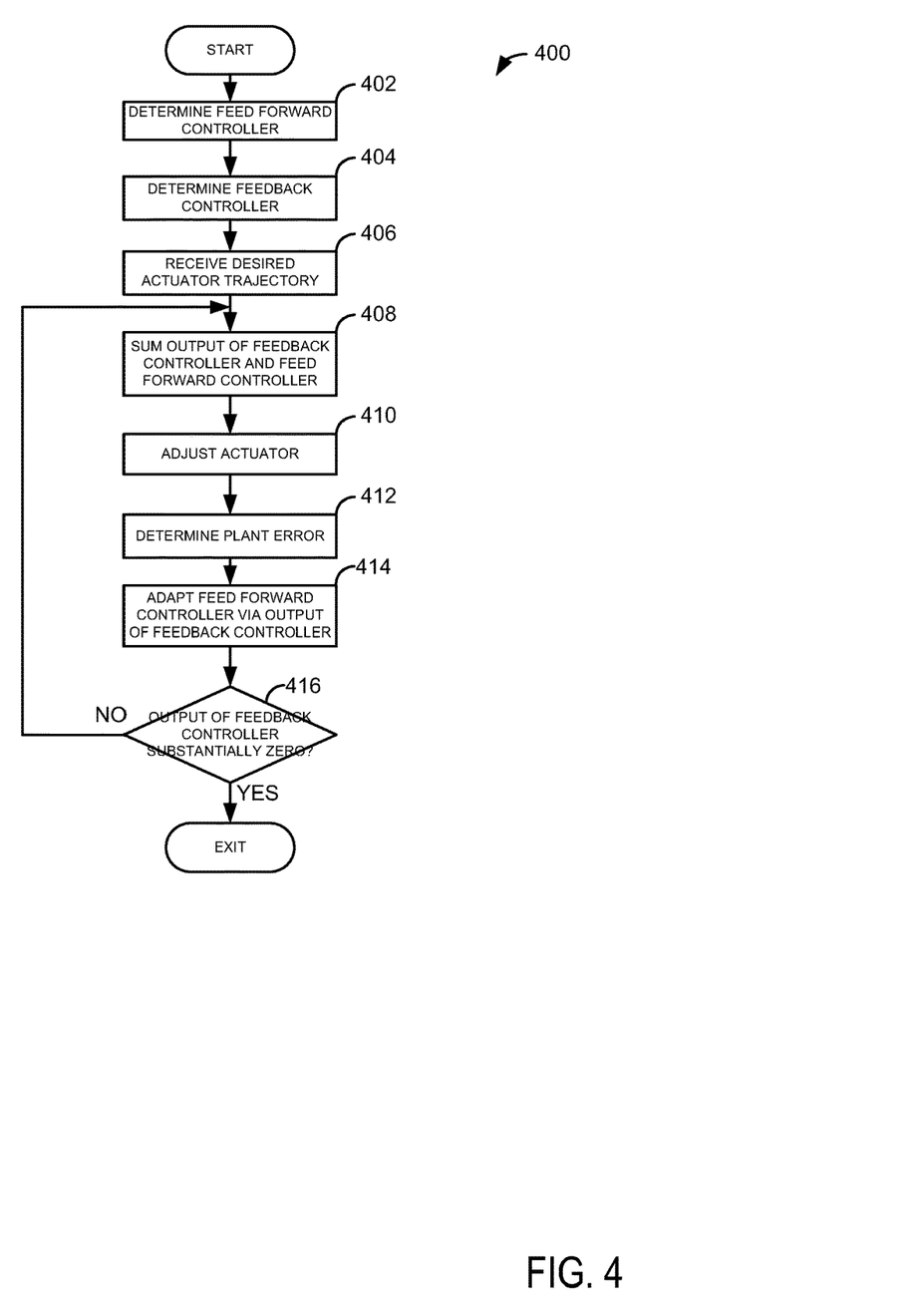
FIG. 4 shows an example method for operating a linear or non-linear plant.

The present description is related to improving operation of non-linear actuators and systems. The actuators and systems may be part of a larger system. In one example as is shown in FIGS. 1 and 2, the actuators and systems may be incorporated into a vehicle and powertrain. FIG. 3 shows a simplified block diagram of an example controller. FIG. 4 shows one example of a method for implementing a controller that provides for adapting an inverse piecewise bilinear model of a plant being controlled.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Intake cam 51 and exhaust cam 53 may be rotated with respect to crankshaft 40 via intake cam actuator 81 and exhaust cam actuator 83. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width signal from controller 12. An air-fuel mixture in combustion chamber 30 may be ignited by spark plug 68. In some examples, throttle 62, spark plug 68, cams 51 and 53, and fuel injector 66 may be referred to as engine torque actuators.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

In some examples, a universal Exhaust Gas Oxygen (UEGO) sensor 126 may be coupled to exhaust manifold 48 upstream of emissions device 70 as is shown. In other examples, the UEGO sensor may be located downstream of one or more exhaust after treatment devices.

Emissions device 70 can include a three-way catalyst in the form of multiple catalyst bricks. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a particulate filter (DPF), and/or a hydrocarbon trap.

In examples where engine 10 is a diesel engine, 66 may be a glow plug and 68 may be a fuel injector. Fuel injection timing may be adjusted with respect to a position of crankshaft 40 to control combustion timing.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure sensor 135 indicates ambient barometric pressure to controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, spark is provided to combust the air-fuel mixture in the cylinder. Alternatively, combustion may be initiated via compression ignition. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a vehicle in which engine 10 may operate is shown. Vehicle 202 is shown including engine 10. In some examples, vehicle 202 may also include a motor/generator 255 for selectively supplying torque to the vehicle's driveline. Vehicle 202 may also an object sensor 290 for sensing objects in the vehicle's path and for adjusting vehicle operation in response to the object. For example, brakes 226 may be applied and operation of a torque actuator of engine 10 may be adjusted if an object is sensed in the vehicle's path. Brakes 226 may be applied automatically by increasing pressure in brake lines via hydraulic pump 228. Further, suspension actuator 224 may adjust the vehicle's height with respect to a road and stiffen or soften the vehicle's ride via changing vehicle suspension dampening.

Referring now to FIG. 3, an example block diagram of a controller is shown. Controller 300 includes a reference signal or trajectory denoted ref. The reference signal is input to lookup table 302 and summing junction 306. The reference signal's derivative with respect to time is taken at 304 and input to lookup table 302.

Lookup table 302 includes table entries and vertexes that describe an inverse or pseudo-inverse model of plant 320. Lookup table 302 operates as a piecewise bilinear model. In this example, the reference input and its derivative with respect to time are inputs to index lookup table 302. If plant 320 is linear and invertible, lookup table 302 is an inverse of plant 320. If plant 320 is non-linear and not invertible, lookup table 302 is pseudo-inverse or approximated inverse of plant 320 since plant 320 is not invertible. Output from lookup table 302 provides a feed forward component $u_{ff}$ of the control output u to plant 320. Feedback controller 308 provides a feedback component $u_{fb}$ of the control output u to plant 320. Parameters $u_{ff}$ and $u_{fb}$ are added together at summing junction 310 before being input to plant 320. Plant 320 may be an actuator in the system as is describe in FIGS. 1 and 2. Alternatively, plant 320 may be a plant in any system where plant 320 may be approximated via a piecewise bilinear model. The response y of plant 320 is fed back to summing junction 306 where it is subtracted from the reference input or signal to provide an error value. The error value is input to feedback controller 308. Feedback controller 308 may be a proportional-integral controller or other type of known controller. The output from feedback controller 308 is directed to lookup table 302 and summing junction 310. Table values and vertexes of lookup table 302 are adapted in response to output of feedback controller 308. Thus, the output from feedback controller 308 operates to remove error from the inverse or pseudo-inverse model represented by lookup table 302, and it also operates to stabilize operation of plant 320 and reduce the effect of errors that may be in lookup table 302 while lookup table 302 is being adapted toward an improved inverse or pseudo-inverse model of plant 320.

Referring now to FIG. 4, an example method for operating a linear or non-linear plant that may be described as an inverse or pseudo-inverse piecewise bilinear model is described. The piecewise bilinear model is a fully parametric model useful for representing linear and non-linear systems. The method of FIG. 4 may be provided as executable instructions stored in non-transitory memory of a system such as the system shown in FIGS. 1 and 2.

At 402, method 400 determines a feed forward controller for operating a plant. The plant may be an actuator in a vehicle system as shown in FIGS. 1 and 2. Alternatively, the plant may be in any system where the plant may be described via a piecewise bilinear model. Further, the plant may be linear or non-linear.

In one example, the feed forward controller may be identified and constructed from offline plant data. Further, the feed forward controller may be implemented as an inverse or pseudo-inverse piecewise bilinear model. The piecewise bilinear model is always formed by matrices, and each value in the matrix is referred to as a vertex in the piecewise bilinear model. In one example, where the feed forward model uses a piecewise bilinear model that is be expressed and implemented as a lookup table that is indexed via one or more variables, the table axes may be defined as the expected limits of the one or more index variables (e.g., where a Y axis of a table is engine speed and an X axis of the table is engine load, the Y axis may extend from 0 to 1 and the X axis may extend from 0 to 7000 RPM). The lookup table entry vertexes may be evenly divided based on the table dimensions and the X and Y axis extents. However, in other examples, a more sophisticated method for identifying the inverse or pseudo-inverse model may be provided. For example, the piecewise bilinear model may be identified via minimizing a performance index based on m samples of plant inputs and outputs. Method 400 proceeds to 402 after the feed forward controller is determined.

At 404, method 400 determines a feedback controller for commanding the plant and providing input to adapt the feed forward controller. In one example, the feedback controller may be implemented as a proportional/integral controller where a command supplied to a plant is based on an error that is determined from a difference between a plant command and plant response. The plant command is adjusted by a proportionate amount of the error. Further, the plant command is adjusted based on the integrated error. In particular, the proportionate amount of error and the integrated error are added together and input as the control command to the plant. In other examples, other types of controllers may be the basis for the feedback controller. For example, a proportional/integral/derivative (PID) controller may be the feedback controller. In still other examples, the feedback controller is the vehicle driver. For example, the driver may change control actions when vehicle performance does not meet the driver's desired or perceived performance. The error provided to the feedback controller may be due to errors in the nominal plant model, deviation of environmental conditions from nominal environmental conditions, an incorrect nominal feed forward controller, or deviation of the feed forward controller from a nominal calibration. Method 400 proceeds to 406 after determining the feedback controller.

At 406, method 400 receives a desired plant trajectory or command input. The desired plant trajectory may be based on a desired predetermined trajectory that provides a desired plant response. For example, a desired vehicle brake application rate that stops a vehicle without causing wheel skid may be input to the control system at 406. In other examples, other desired command inputs for other actuators such as camshaft actuators, throttle actuators, fuel injectors, vehicle speed actuators, torque control actuators, turbocharger waste gate actuators, climate control actuators, and vehicle suspension actuators may be input to the system depending on the plant being controlled.

The desired plant trajectory is input to the feed forward controller. The desired plant trajectory is also input to a feedback controller as part of an error determined by subtracting the plant's response from the desired plant trajectory as shown in FIG. 3. Method 400 proceeds to 408.

At 408, method 400 sums the output of the feed forward controller and output of the feedback controller to provide a control command u to the plant. Thus, the command signal to the plant includes a feed forward portion of a command u and a feedback portion of command u. If the feed forward portion of the command includes no error, the feedback portion of the plant command goes to zero. Method 400 proceeds to 410 after the feed forward and feedback control commands are summed together.

At 410, method 400 adjusts operation of the plant. The plant may be an actuator or actuator such as engine torque actuators, vehicle suspension actuators, vehicle speed control actuators, or some other actuators that may be described by a piecewise bilinear model. Further, several actuators of the actuators described herein may be adjusted simultaneously to control vehicle speed, engine torque, engine speed, and vehicle traffic following characteristics. Further still, several versions of the method of FIG. 4 may be incorporated into controlling the engine or the vehicle. For example, an engine throttle and intake cam may be simultaneously controlled by separate versions of the method of FIG. 4 or via a single version of the method of FIG. 4. The actuator may be commanded via electric energy, pneumatic energy, chemical energy, or other known actuator type. Method 400 proceeds to 412 after the plant or actuator is commanded.

At 412, method 400 determines error between the desired actuator or plant trajectory and actual actuator or plant trajectory. In particular, the plant's trajectory is subtracted from the desired plant trajectory to provide a plant error. Method 400 proceeds to 414 after plant error is determined.

At 414, method 400 adapts lookup table entries and vertexes to improve the inverse or pseudo-inverse piecewise bilinear model that has been presented in the form of a lookup table. In one example, the lookup table may be adapted via an online sequential learning algorithm, and interpolation between lookup table entries and vertexes is based on bilinear interpolation.

A simplified plant model may be expressed as y=p(u) where y is output and u is control input. The inverse may be expressed as $u=p^{-1}(y)$ assuming that the plant is invertible. The inverse model for the feed forward controller in the FEL may be expressed as $u_{ff}=p^{-1}(r,\dot{r})$ where r is a desired output $y_d$ and where $\dot{r}$ is $\dot{y}_d$. The feed forward controller in this example includes two inputs y and $\dot{y}$ as well as a single output $u_{ff}$. Further, the feed forward controller in this example includes a pseudo-inverse model since the plant is generally not invertible unless its relative degree is zero.

The feed forward control parameters are learned to minimize a performance index described by:

$$I = \frac{(u_{ff} - u_0)^2}{2}$$

Where $u_{ff}$ is the feed forward output, $u_0$ is the ideal feed forward control output, where $u_{ff}=p^{-1}(r,\dot{r},V)$, and where V is a matrix of vertexes. The piecewise bilinear representation of the feed forward controller is:

$$u_{ff} = p^{-1}(r, \dot{r}, V) = \sum_{i=\sigma}^{\sigma=1}\sum_{j=\tau}^{\tau=1} w_1^i(r) w_2^j(\dot{r}) V(i, j)$$

The derivative of I may be expressed as:

$$\frac{\partial I}{\partial V} = \frac{\partial u_{ff}}{\partial V}(u_{ff} - u_0)$$

The variable I can be sequentially minimized using its derivative; however, the error $(u_{ff}-u_0)$ is not available since $u_0$ is unknown. Instead, the output of the feedback controller $u_{fb}$ may be used in place of $(u_{ff}-u_0)$. The derivative of I becomes:

$$\frac{\partial I}{\partial V} = \frac{\partial u_{ff}}{\partial V}u_{fb} = \frac{\partial p^{-1}(r,\dot{r},V)}{\partial V}u_{fb}$$

Sequential learning is applied via the following algorithm:

$$V_{new} = V_{old} - \delta\frac{\partial p^{-1}(r,\dot{r},V)}{\partial V}u_{fb}$$

Where δ is an adjustable parameter for the adaptive learning rate. If learning is successful, $V_{new}=V_{old}$ and $u_{fb}$ becomes zero. A model parameter corresponding to each vertex of a region is updated as:

$$V_{new(i,j)} = V_{old(i,j)} - \delta\frac{\partial u_{ff}}{\partial V_{(i,j)}}u_{fb}$$

Variables $V_{new}$ and $V_{old}$ refer to the values of four vertexes of a region. Therefore, the partial derivative of $u_{ff}$ with respect to each of the vertexes becomes:

$$\nabla p^{-1} = \left(\frac{\partial u_{ff}}{\partial V_{(\sigma,\tau)}}, \frac{\partial u_{ff}}{\partial V_{(\sigma,\tau+1)}}, \frac{\partial u_{ff}}{\partial V_{(\sigma+1,\tau)}}, \frac{\partial u_{ff}}{\partial V_{(\sigma+1,\tau+1)}}\right)$$

When the piecewise bilinear model is two dimensional the feed forward output becomes:

$$u_{ff}=(1-\alpha)(1-\beta)V_{(\sigma,\tau)}+(1-\alpha)\beta V_{(\sigma,\tau+1)}+\alpha(1-\beta)V_{(\sigma+1,\tau)}+\alpha\beta V_{(\sigma+1,\tau+1)}$$

Every value of $u_{ff}$ is interpolated between the values of four vertexes defining a region. The calculation of partial derivatives becomes:

$$\nabla p^{-1}=((1-\alpha)(1-\beta),(1-\alpha)\beta,\alpha(1-\beta),\alpha\beta)$$

The change in each vertex of a region becomes:

$$V_{new(\sigma,\tau)}=V_{old(\sigma,\tau)}-\delta(1-\alpha)(1-\beta)u_{fb}$$

$$V_{new(\sigma,\tau+1)}=V_{old(\sigma,\tau+1)}-\delta(1-\alpha)\beta u_{fb}$$

$$V_{new(\sigma+1,\tau)}=V_{old(\sigma+1,\tau)}-\delta\alpha(1-\beta)u_{fb}$$

$$V_{new(\sigma+1,\tau+1)}=V_{old(\sigma+1,\tau+1)}-\delta\beta u_{fb}$$

In this way, the feed forward values and the vertexes of the lookup table are adjusted based on output from the feedback controller. Method 400 proceeds to 416 after the lookup table is adjusted.

At 414, method 400 judges whether or not output of the feedback controller is substantially zero or within a predetermined range of zero depending on the plant being controlled. For example, if the control command to the plant being controlled is between −100 and 100, method 400 may determine that output of the feedback controller is within a predetermined range of zero when output of the feedback controller is between −2 and 2. If method 400 judges that output of the feedback controller is substantially zero, the answer is yes and method 400 proceeds to exit. Otherwise, the answer is no and method 400 continues to adapt values in the lookup table. It should be mentioned that if the plant is operating at relatively steady state conditions and output from the feedback controller is determined to be within a predetermined range of zero, method 400 may exit and may further adapt other regions in the lookup table when the plant operating conditions change. Additionally, the feedback controller may continue to operate so that if conditions of the plant change, the system may be driven back to the desired control point. Lookup tables may be adapted if the feedback controller output deviates from zero or from within a predetermined range of zero.

Thus, the method of FIG. 4 provides for controlling a system, comprising: providing a pseudo-inverse piecewise bilinear model of a plant; adapting the pseudo-inverse piecewise bilinear model based on an output of a feedback controller; and adjusting operation of an actuator in response to the pseudo-inverse piecewise bilinear model. The method includes where pseudo-inverse piecewise bilinear model is implemented via a lookup table, and where the plant is the actuator. The method includes where the pseudo-inverse piecewise bilinear model represents an approximate inverse of a noninvertible plant model.

In some examples, the method includes controlling multiple actuators controlling engine torque. The method includes where the engine torque actuator is one or a combination of a camshaft actuator, a throttle actuator, a wastegate actuator, spark controller, or a fuel injector. The method includes controlling vehicle speed via multiple actuators. The method includes where the vehicle speed control actuator is one or a combination of a vehicle brake actuator or a throttle actuator. The method also includes where the actuator is a turbocharger waste gate actuator.

The method of FIG. 4 also provides for controlling a system, comprising: providing a piecewise bilinear model of a plant; adapting the piecewise bilinear model in response to an output of a feedback controller; and adjusting operation of an actuator in response to the piecewise bilinear model and the output of the feedback controller. The further comprises driving output of the feedback controller toward zero via adapting the piecewise bilinear model. The method includes where the piecewise bilinear model is in a form of a lookup table, and where the plant is the actuator. The method includes where adapting the piecewise bilinear model includes adjusting a table entry of the lookup table.

In some examples, the method includes where adapting the piecewise bilinear model includes adjusting one or more table vertexes. The method includes where a reference trajectory is input to the piecewise bilinear model of the plant and where an output of the piecewise bilinear model is added to an output of the feedback controller. The method includes where the actuator is a vehicle brake system actuator. The method includes where the actuator is a vehicle climate control actuator.

The method of FIG. 4 also provides for controlling a non-linear system, comprising: providing a piecewise bilinear model of a non-linear plant; adapting the piecewise bilinear model via minimizing a performance index in response to an output of a feedback controller; and adjusting operation of an actuator in response to the piecewise bilinear model and the output of the feedback controller. The method further comprises supplying the feedback controller a state of the actuator, and where the actuator is the non-linear plant. The method includes where the actuator is an actuator of a vehicle. The method includes where the actuator is an engine torque actuator.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used. Further, the methods described may be implemented in hardware, software, or a combination of hardware and software. Further still, the methods may be stored as executable instructions in a non-transitory medium in the system shown in FIGS. 1 and 2.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for controlling a system, comprising:
producing, with an engine position sensor, an indication of engine speed;
providing a pseudo-inverse piecewise bilinear model of a plant, wherein an axis of a matrix of the pseudo-inverse piecewise bilinear model implemented in a feed forward controller is engine speed;
adapting the pseudo-inverse piecewise bilinear model based on an output of a feedback controller; and
adjusting operation of an actuator in response to the pseudo-inverse piecewise bilinear model including the sensed engine speed;
wherein the actuator is an engine torque actuator.

2. The method of claim 1, where the pseudo-inverse piecewise bilinear model is implemented via a lookup table, and where the plant is the actuator.

3. The method of claim 1, where the pseudo-inverse piecewise bilinear model represents an approximate inverse of a noninvertible plant model.

4. The method of claim 1, where the engine torque actuator is one of a camshaft actuator, a throttle actuator, or a fuel injector.

5. A method for controlling a system, comprising:
producing, with an engine position sensor, an indication of engine speed;
providing an inverse piecewise bilinear model of a plant, wherein an axis of a matrix of the inverse piecewise bilinear model implemented in a feedforward controller is engine speed;
adapting the inverse piecewise bilinear model in response to an output of a feedback controller; and
adjusting operation of an actuator in response to the inverse piecewise bilinear model including the sensed engine speed and the output of the feedback controller;
wherein the actuator is a vehicle brake system actuator.

6. The method of claim 5, further comprising driving output of the feedback controller toward zero via adapting the inverse piecewise bilinear model.

7. The method of claim 6, where the inverse piecewise bilinear model is in a form of a lookup table, and where the plant is the actuator.

8. The method of claim 7, where adapting the inverse piecewise bilinear model includes adjusting a table entry of the lookup table.

9. The method of claim 7, where adapting the inverse piecewise bilinear model includes adjusting one or more table vertexes.

10. The method of claim 5, where a reference trajectory is input to the inverse piecewise bilinear model of the plant and where an output of the inverse piecewise bilinear model is added to the output of the feedback controller.

11. A method for controlling a non-linear system, comprising:
producing, with an engine position sensor, an indication of engine speed;
providing a piecewise bilinear model of a non-linear plant, wherein an axis of a matrix of the piecewise bilinear model implemented in a feedforward controller is engine speed;

adapting the piecewise bilinear model via minimizing a performance index in response to an output of a feedback controller; and adjusting operation of an actuator in response to the piecewise bilinear model and the output of the feedback controller;

wherein the actuator is an actuator of a vehicle.

12. The method of claim 11, further comprising supplying the feedback controller a state of the actuator, and where the actuator is the non-linear plant.

13. The method of claim 11, where the actuator is an engine torque actuator.

* * * * *